Jan. 21, 1941.   L. LOMANDO   2,229,106
CHAIN
Filed Dec. 13, 1939
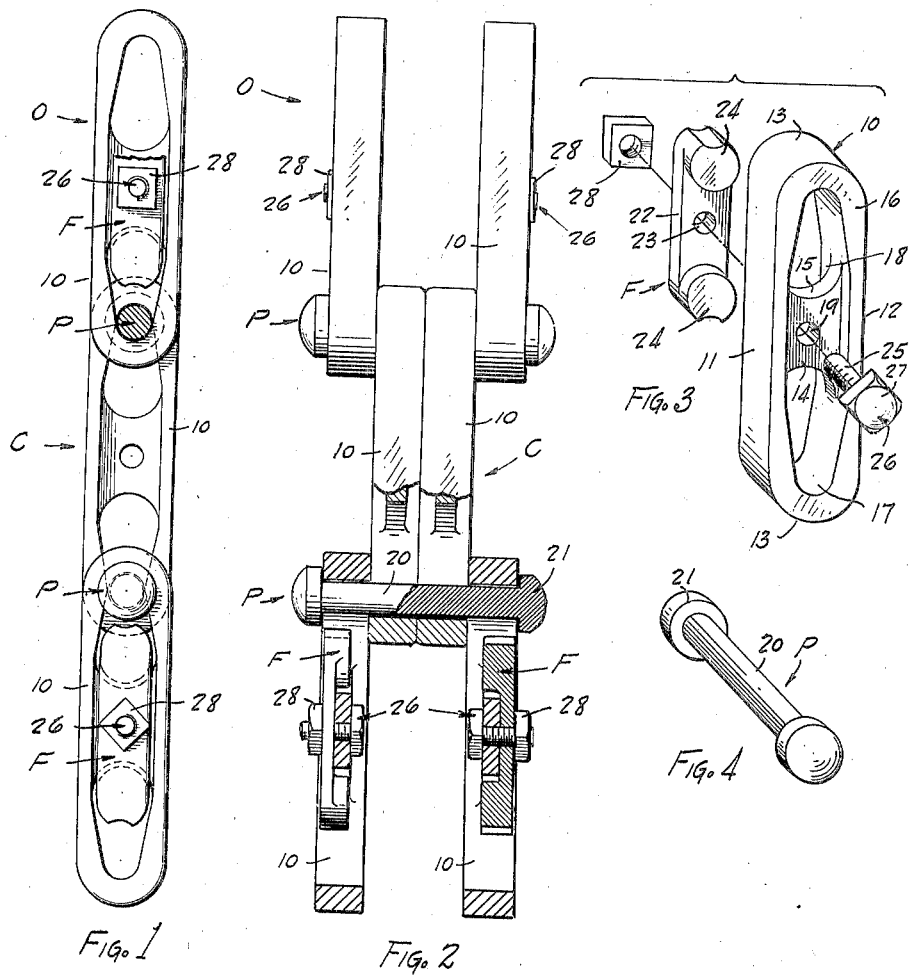
INVENTOR.
LEWIS LOMANDO
BY
ATTORNEY.

Patented Jan. 21, 1941

2,229,106

UNITED STATES PATENT OFFICE 2,229,106

CHAIN

Lewis Lomando, Hazleton, Pa.

Application December 13, 1939, Serial No. 308,905

4 Claims. (Cl. 74—254)

This invention has to do with chain constructions and is concerned primarily with that type of chain commonly employed around collieries and similar places where they enter into the conveying of coal.

Chain constructions of the type with which this invention is concerned have been meeting with widespread use in the field above enumerated, and their construction has been fairly well standardized so as to meet conditions attending their usage. Generally speaking, a chain of this type comprises alternate central links between which are positioned alternate outer links that are connected to the central links by headed cross pins. The present invention proposes to follow this more or less standard construction, but provides improvements therein, as will be hereinafter pointed out.

An important object of the invention is the provision of a chain of the general character noted in which the outer links, carrying recesses for reception of the headed pins, also carry means for properly spacing the pins in their recesses, that is, the pins are kept in proper assembled relation so as not to come free from the recesses; this object may be accomplished in combination with a construction in which each center link is made up of a pair of link elements which are duplicates of each other and are also duplicates of the outer link members.

Yet another object of the invention is to provide, in a chain of the character above noted, link elements which readily adapt themselves to having the headed connecting pins assembled therewith in a novel manner.

More in detail this invention contemplates an arrangement in which each outer link element is formed at each end with a small opening designed to receive the shank of a connecting pin, and which gradually merges in with a larger opening or recess through which a head of the connecting pin may pass. In assembling the links the larger recesses are brought into proper alignment so that a head of the connecting pin may pass therethrough in positioning the pin, after which the link elements are moved with respect to each other so that the shank of the pin is brought into the smaller recesses. Suitable spacing elements are then assembled with certain of the link elements to fill the larger recesses and hold the pins in their properly assembled relation.

Various other more detailed objects and advantages of the invention such as arise in connection with providing a link element of the necessary shape and filler means which will cooperate therewith will in part become apparent, and in part be hereinafter stated, as the description of the invention proceeds.

The invention, therefore, comprises a chain construction including alternate central links and alternate outer links. Each of the outer links is provided with recesses for the reception of connecting pins to connect them to the central links and each outer link also carries means for spacing the pins with relation to the recesses so as to maintain the links in assembled relation. Each of the outer link assemblies and central link assemblies may be made up of identical elements so that the manufacture of only one type of link element is required for the manufacture of the plurality of link elements necessary to complete a chain.

For a full and more complete understanding of the invention reference may be had to the following description and accompanying drawing, wherein Figure 1 is a view in side elevation of a portion of a chain which is made in accordance with the precepts of this invention, Figure 2 is a top plan view of the section of chain shown in Figure 1 with parts broken away and shown in section, Figure 3 is a perspective view of one of the link elements and the filler means which is associated therewith, the various parts being developed in exploded relation, and Figure 4 is a detailed perspective view of one of the connecting pins per se.

Referring now to the drawing, wherein like reference characters denote corresponding parts, and first more particularly to Figures 1 and 2, it will be noted that a chain made in accordance with this invention includes a central link assembly referred to in its entirety by the reference character C, and outer link assemblies referred to in their entirety by the reference character O. It is to be understood that a complete chain will ordinarily be of an endless construction, and will comprise alternate central link assemblies C which are interspersed by the alternate outer link assemblies O.

The central link assembly C comprises a pair of link elements which are placed in side by side position, as illustrated, each of which is identified by the reference character 10. Each of the link elements making up the outer link assemblies O is also identical in construction with the link elements 10 making up the central link assembly C, and these link elements in the outer assemblies are also identified as 10, and in the latter assemblies are maintained in spaced relation by the reception of the ends of the central link assemblies C therebetween.

Referring now more particularly to Figure 3, the construction of one of the link elements 10 will be described in detail. Such a link element 10 comprises side walls 11 and 12 which are connected by curved ends 13. Extending between the side walls 11 and 12 is a central web 14 which, it is important to note, is of a thickness materially less than the extent of the side walls 11 and 12. This web is disposed centrally of these walls. At each end the web 14 is curved, as represented at 15, to provide what is, in effect, an enlarged recess.

These side walls 11 and 12 are thickened towards the curved ends 13, as shown at 16, and these thickened walls provide what are, in effect, smaller recesses at the ends of the link elements. For the purposes of this specification the smaller recesses are identified by the reference character 17, while the larger recesses which communicate therewith are designated 18. It is also notable that the web 14 is formed wtih a small opening 19.

Referring now to Figure 4, a headed connecting pin is there illustrated and referred to in its entirety by the reference character P. This connecting pin P comprises a central shank 20 of substantially cylindrical formation, and which shank carries at each end circular heads designated 21.

In assembling a chain a pair of link elements 10 are placed in the side by side position shown in Figure 2, and another pair of the link elements 10 are positioned so that they are maintained spaced apart by the central links, and the larger recesses 18 of each of the four link elements are brought into alignment. The connecting pin P is now inserted in the aligned openings with one of the heads 21 passing through the larger recesses 18.

When this insertion of the pin has been carried out so that each head is positioned on the exterior of the links 10 of the outer link assembly, the latter are moved with respect to the link elements 10 of the central link assembly so that the shank 20 is positioned in the smaller recesses 17. When this relation has been attained a filler element referred to in its entirety by the reference character F is assembled with each link element 10 of the outer link assembly O. One of these filler elements F is shown in detail in Figure 3, and comprises a back 22 which is designed to overlie the web 14 on the outer side thereof and assume a position between the walls 11 and 12.

This back 22 is formed with an opening 23 which aligns with the opening 19. At each end the back 22 carries a circular projection 24, and these projections 24 are designed to substantially fill each of the larger recesses 18.

When the filler element F has been assembled with one of the link elements 10 in the manner aforesaid, the assembled relationship is maintained by passing the stem 25 of a headed bolt 26 through the aligned openings 19 and 23. The head of the bolt, which is identified at 27, is received between the walls 11 and 12, and engages the web 14 on the face opposite to that engaged by the back 22 of the filler means F.

A nut 28 may then be threaded on the stem 25 to clamp the filler F to the web 14. In this position the larger recesses 18 are filled, and it is impossible for the shank 20 of the pin P to move thereinto. Thus the connecting pin is maintained in that position establishing the assembled, usable condition of the chain.

In the form of the invention illustrated in the drawing, the fillers F are shown as associated with the outer links 10 only. While it is possible to assemble similar fillers with the central link assembly C, the invention has particularly in mind the assembly of "flights" with the central links C in a manner well-known in this art. These "flights" are features commonly employed in chains of this character about collieries, and aid in the conveying of the coal, and it is not thought necessary to here go into a detailed description of the construction thereof, nor to illustrate the same in the drawing. It suffices to say that they are carried by the central link assemblies C.

From the foregoing it is apparent that a manufacturer engaged in the production of the various parts making up the chain will only have to produce one type of link element. Also, the various link elements may be readily assembled in the manner above described by simple and easy operations. While assurance is had that the proper assembled relationship will be maintained during operation of the chain, when it becomes necessary to replace any damaged or worn parts, the required dissembly may be achieved by removing the filler elements F.

While a preferred specific embodiment of the invention is hereinbefore set forth it is to be clearly understood that the invention is not to be limited to the exact construction illustrated and described, because various modifications of these details may be provided in putting the invention into practice within the purview of the appended claims.

I claim:

1. A chain of the character described comprising alternate central link assemblies and alternate outer link assemblies, each of the outer link assemblies comprising a pair of link elements which are maintained in spaced relation by the extremities of the adjacent central link assemblies, each of the central link assemblies consisting of a pair of link elements which are duplicates of the link elements of the outer link assemblies, each of said link elements comprising spaced side walls connected by curved end walls, a web between said side walls and cooperating with the end walls to define communicating larger and smaller recesses with the smaller recesses at the ends of the link elements, connecting pins having shanks and heads that are adapted to pass through said larger recesses, the shanks of said connecting pins being received in the smaller recesses, each of said webs being formed with an opening, and a filler member carried by the web of each link element of said outer link assembly, said filler member having an opening aligning with the opening in said web, and fastening means passing through said aligned openings for securing said filler members to said webs.

2. In a chain of the character described, a link element comprising spaced side walls connected by curved end walls, a web having a thickness less than the height of said side walls and extending therebetween centrally of, and spaced from, said curved end walls, and filler means enclosed by said side walls and carried by said web.

3. A chain of the character described comprising alternate central link assemblies and alternate outer link assemblies, each of the outer link assemblies comprising a pair of link elements which are maintained in spaced relation by the extremities of the adjacent central link assemblies, each of the central link assemblies consisting of a pair of link elements which are duplicates of the link elements of the outer link assemblies, each of said link elements comprising spaced side walls connected by curved end walls, a web between said side walls and cooperating with the end walls to define communicating larger and smaller recesses with the smaller recesses at the ends of the link elements, connecting pins having shanks and heads that are adapted to pass through said larger recesses, the shanks of said connecting pins being received in the smaller recesses, each of said webs having a thickness less than the height of said side walls with each web connected to the side walls intermediate the edges thereof, and a filler member carried by the web of each link element of the outer link assembly, said filler members being substantially enclosed by the side walls of each link element.

4. In a chain of the character described, a link element comprising spaced side walls connected by curved end walls, a web having a thickness less than the height of said side walls and extending therebetween, said web being spaced from said curved end walls to provide openings through which connecting pins are adapted to pass, said web cooperating with said side walls and curved end walls to define a recess on one face of said link, and a filler member in said recess engaging said web and being substantially enclosed by said side walls, said filler member extending partially over said openings through which the connecting pins are adapted to pass.

LEWIS LOMANDO.